(12) United States Patent
White (10) Patent No.: US 8,038,096 B2
(45) Date of Patent: Oct. 18, 2011

(54) AIRCRAFT LANDING GEAR ASSEMBLY

(75) Inventor: Nicholas J. White, Bristol (GB)

(73) Assignee: Airbus Operations Limited, Bristol (GB)

( * ) Notice: Subject to any disclaimer, the term of this patent is extended or adjusted under 35 U.S.C. 154(b) by 562 days.

(21) Appl. No.: 12/190,742

(22) Filed: Aug. 13, 2008

(65) Prior Publication Data

US 2009/0057484 A1 Mar. 5, 2009

(30) Foreign Application Priority Data

Aug. 29, 2007 (GB) .................................. 0716675.4

(51) Int. Cl.
*B64C 25/10* (2006.01)
(52) U.S. Cl. ................................ 244/102 A; 244/102 R
(58) Field of Classification Search .............. 244/102 R, 244/102 A
See application file for complete search history.

(56) References Cited

U.S. PATENT DOCUMENTS

| 4,345,727 A | * | 8/1982 | Brown et al. ............. 244/102 R |
| 2009/0014582 A1 | * | 1/2009 | De Ruffray et al. ...... 244/102 R |

FOREIGN PATENT DOCUMENTS

| EP | 0031602 A1 | 7/1981 |
| EP | 0451910 A1 | 10/1991 |
| EP | 0564772 A1 | 10/1993 |
| EP | 1407963 A2 | 4/2004 |
| GB | 490087 A * | 5/1937 |
| GB | 523430 | 7/1940 |
| GB | 490087 | 8/2008 |

OTHER PUBLICATIONS

UK Search Report for GB0716675.4 dated Nov. 27, 2007.

* cited by examiner

*Primary Examiner* — Timothy D Collins
*Assistant Examiner* — Nicholas McFall
(74) *Attorney, Agent, or Firm* — Lowe, Hauptman, Ham & Berner, LLP (57) ABSTRACT

An aircraft landing gear assembly comprises a four bar linkage arranged to be pivotably attached to an aircraft fuselage and movable between a deployed position and a retracted position, wherein when in the retracted position at least a first portion of the landing gear assembly is housed within a wing at the aircraft.

8 Claims, 6 Drawing Sheets

AIRCRAFT LANDING GEAR ASSEMBLY

RELATED APPLICATIONS

The present application is based on, and claims priority from, British Application Number 0716675.4, filed Aug. 29, 2007, the disclosure of which is hereby incorporated by reference herein in its entirety.

BACKGROUND TO THE INVENTION

For larger civil or military aircraft it is conventional practice for the aircraft to have a single landing gear assembly located in the nose of the aircraft and a matched pair of landing gear assemblies located on either side of the aircraft in the proximity of the wing roots. The latter landing gear is generally termed the main landing gear assembly. It is conventional practice for both the nose landing gear assembly and main landing gear assembly to be arranged to be movable between a deployed position and a stowed position.

When the main landing gear is in the deployed, down, position it is beneficial for the distance between the pair of landing gear assemblies (the "track") to be as wide as possible, since this maximises the stability of the aircraft on the ground during taxiing and runway manoeuvres. A well known way to achieve a wide track for the main landing gear is to mount each main landing gear assembly in each of the respective wings and to arrange for the main landing gear assemblies to retract to their stowed positions within the wing body and in some cases also partially within the fuselage body. However, for large aircraft, such as a commercial passenger airliners or freight aircraft, this results in relatively large loadings being transferred from the main landing gear assemblies into the wing structures. This requires the wing structures themselves to often be larger and heavier to carry these loads than would otherwise be required purely for the aerodynamic loading of the wing. Apart from the undesirable increase in weight, the increased wing structures also reduces the amount of space available within the wing structure for use in packaging wing service actuator systems (e.g. flaps), electrical systems, fuel tanks and ultimately space to stow the landing gear itself.

Another arrangement for the main landing gear that avoids placing large loads through the wing structures is the well known alternative of using body mounted landing gear, in which the main landing gear assemblies are mounted within the fuselage of the aircraft and are arranged to be stowed also within the aircraft fuselage. However, in order to maximise the landing gear track for body mounted landing gear assemblies it is known to use cantilevered main landing gear assemblies that position the actual wheels of the landing gear towards, if not beyond, the far extremities of the aircraft fuselage and with the wheels of the landing gear assemblies being further apart than the points at which the landing gear assembly is pivotably connected to the fuselage. As a corollary to this, such arrangements of main landing gear tend not to be capable of being housed in their stowed position completely within the nominal outline of the main fuselage and require a fuselage belly fairing, which is an enlarged area of the lower part of the fuselage, to enclose the landing gear in the stowed position. For larger belly fairings this can be detrimental to the overall aerodynamics of the aircraft, thus reducing the aircraft's theoretical performance. Additionally, the large belly fairings give rise to relatively large landing gear bay doors that must be arranged to fold out of the way when the landing gear is deployed. The large landing bay doors can limit the size of the movable wing surfaces closer to the junction between the wing and fuselage, again reducing the theoretical aerodynamic performance of the aircraft. In addition, since the landing gear assembly is stowed within the aircraft fuselage, this space cannot be used for other purposes, such as cargo stowage.

The main landing gear assembly arrangement of the present invention seeks to at least mitigate some of these problems.

SUMMARY OF THE INVENTION

According to a first aspect of the present invention there is provided an aircraft landing gear assembly comprising a four bar linkage arranged to be pivotably attached to an aircraft fuselage and movable between a deployed position and a retracted position, wherein when in the retracted position at least a first portion of the landing gear assembly is housed within a wing of the aircraft.

Additionally, when in the retracted position at least a second portion of the landing gear assembly is preferably housed within the aircraft fuselage.

The landing gear assembly preferably may comprise a landing gear leg, a main arm pivotably attached at a first end to the landing gear and arranged to be pivotably attached at a second end to the aircraft fuselage, and a side brace pivotably attached at a first end to the landing gear leg and arranged to be pivotably attached at a second end to the aircraft fuselage, wherein the landing gear leg, main arm and side brace comprise the four bar linkage. When in the retracted position a majority of the main arm is preferably housed within the aircraft wing.

The landing gear leg may be arranged to have at least one landing wheel mounted thereon, wherein when the landing gear assembly is in the retracted position a majority of the landing wheel is housed within the aircraft fuselage.

Additionally, a retraction actuator may be preferably but not exclusively connected between the side brace and the aircraft fuselage.

The aircraft landing gear assembly may further comprise a folding stay assembly pivotably attached to the main arm and the aircraft fuselage and arranged to brace the landing gear assembly when the assembly is in the deployed position.

The aircraft landing gear assembly may be arranged to be pivotably attached to the aircraft fuselage by means of one or more revolute joints.

According to second aspect of the present invention there is provided an aircraft including a landing gear assembly according to the first aspect of the present invention.

BRIEF DESCRIPTION OF THE DRAWINGS

Embodiments of the present invention will now be described, by way of non-limiting example only, with reference the accompanying figures, of which.

DETAILED DESCRIPTION OF EMBODIMENTS OF THE PRESENT INVENTION

Figure 1:
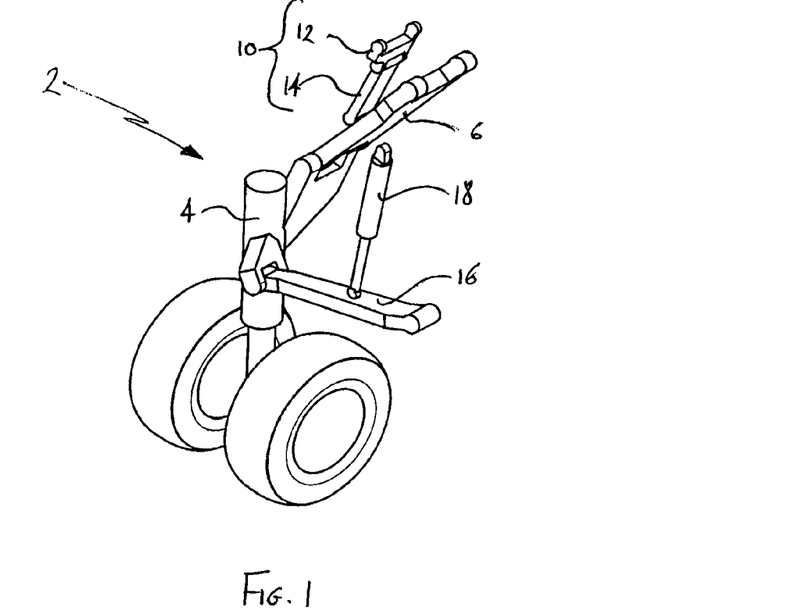
FIG. 1 is an isometric view of a main landing gear assembly in a deployed position according to a first embodiment of the present invention.
Figure 2:
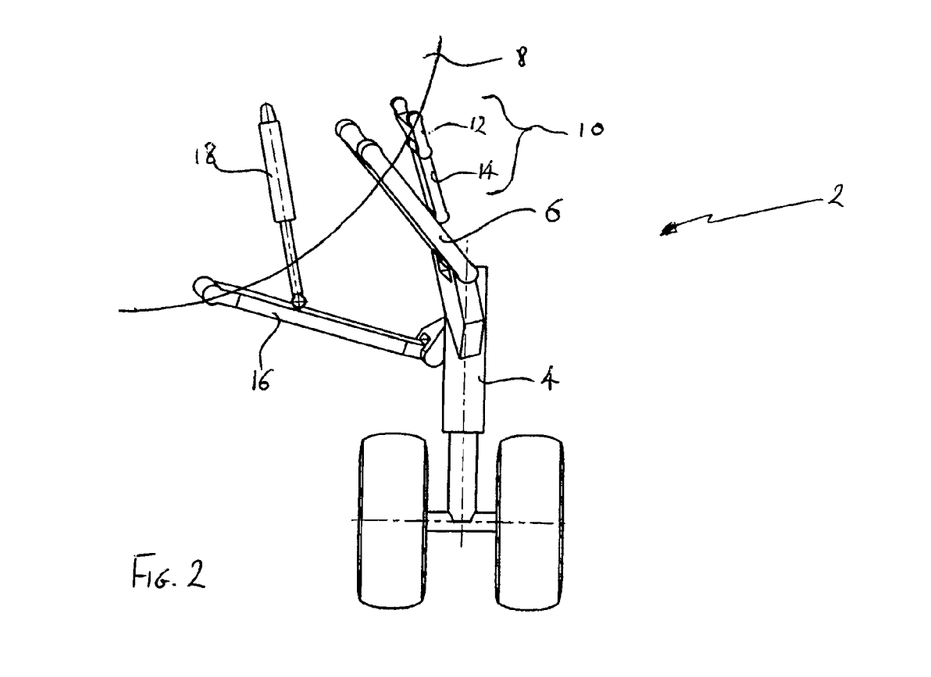
FIG. 2 is a front view of the landing gear assembly of FIG. 1 in the deployed position.
Figure 3:
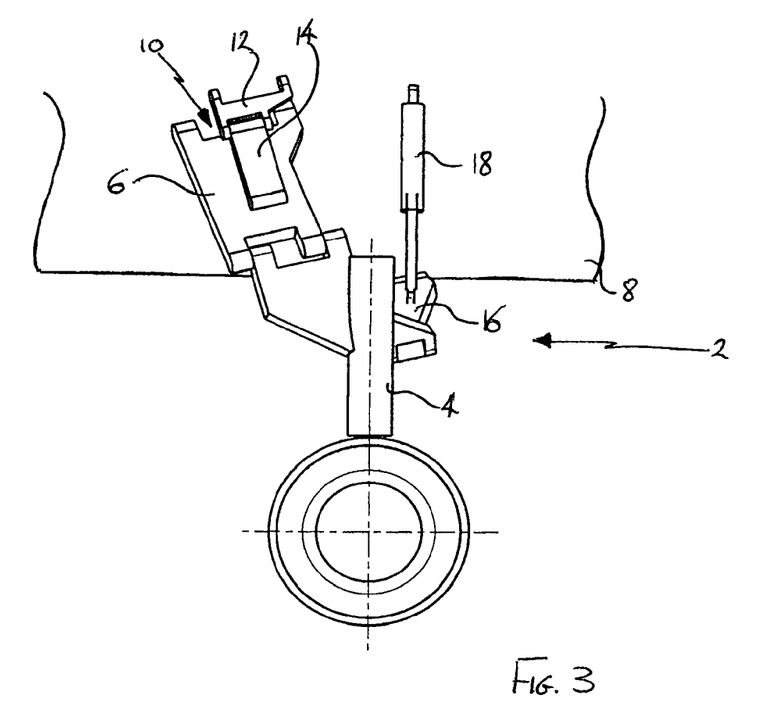
FIG. 3 is a side view of the main landing gear assembly of FIGS. 1 and 2 in the deployed position.

FIGS. 1 to 3 schematically illustrate a main landing gear assembly according to a first embodiment of the present invention in the deployed position. FIGS. 1 to 3 all show a port side landing gear assembly, with FIG. 1 being an isometric view of the rear of the landing gear assembly, FIG. 2 being a front view of the landing gear assembly, i.e. looking towards the rear of the aircraft, and FIG. 3 is a side view of the landing gear assembly with the front of the aircraft being towards the left hand side of the figure. The main landing gear assembly 2 comprises a main landing gear leg 4 that includes a lower piston to which the landing gear axle, wheels, tyres and brakes are mounted, the slidable piston being telescopically received in an upper housing. The slidable piston and upper housing of the main landing leg 4 provides a shock absorbing capability in a known manner, such as by compression of oil and nitrogen held within a reservoir in the upper housing of the main landing leg. The sliding piston and upper portion of the main landing gear leg 4 are preferably connected by the known arrangement of torque links (not shown) that prevent the sliding piston from rotating inside the upper housing of the main landing gear leg, and hence also the axle, wheels and tyres. An upper arm 6 is pivotably attached to the main landing gear leg 4, preferably by means of a revolute joint at one end of the arm, and is pivotably attached to the fuselage 8 of the aircraft, preferably again by means of a revolute joint. The main arm 6 is braced in the deployed position by a folding stay assembly 10, which includes an upper folding member 12 pivotably attached to the fuselage 8 and a lower folding member 14 pivotably attached to the upper folding member 12 and to the main arm 6. The folding stay assembly 10 is itself braced by a known arrangement of lock stays (not illustrated) that are arranged to be rotated over centre by an unlocking actuator (not illustrated) when it is required to retract the landing gear. The lock stays are prevented from rotating over centre in a conventional manner by a set of lock springs (not illustrated). The main landing gear leg 4 is also braced laterally in the deployed position by an elongate side brace 16 that is pivotably attached at one end to the upper portion of the main landing gear leg 4 and pivotably attached to the other end to the aircraft fuselage 8. Again, revolute joints are preferably used to attach the side brace 16 to the main landing gear leg 4 and aircraft fuselage 8. A main retraction actuator 18 is attached between the side brace 16 and the aircraft structure.

The main landing gear leg 4, the aircraft fuselage 8 and the generally elongate main arm 6 and side brace 16 form a "four bar linkage" that allows the main landing gear assembly 2 to be reversibly moved between the deployed and stowed positions. Since all the attachment points to the aircraft structure are through the fuselage 8, as opposed to any of the wing structures, any loadings carried by the landing gear assembly are passed through to the fuselage structures.

To retract the landing gear assembly the previously mentioned unlock actuator (not illustrated) pulls, or alternatively pushes, depending upon the selected lock stay geometry, the lock links (not illustrated) over centre. As the unlock actuator pulls further on the lock links the folding stay assembly 10 is also pulled over centre at the joint between the upper folding member 12 and lower folding member 14, such that the pivotable connection between the upper and lower folding members moves towards the main arm 6 of the landing gear assembly. As the folding stay assembly 10 becomes unlocked the main retraction actuator 18, which may be any suitable linear actuator, such as a hydraulic or electric ram, can commence to pull on the side brace 16 causing the side brace to rotate upwards relative to the aircraft body about the pivotable joint between the side brace 16 and the aircraft fuselage 8. This in turn causes the main arm 6 to rotate upwards about the joint where it attaches to the aircraft structure, since the main arm 6 and side brace 16 are connected to the main landing gear leg 4 in the previously mentioned "four bar linkage" arrangement. By virtue of this geometry, and the selected lengths of the side brace 16 and main arm 6, the top of the main landing gear leg 4 is caused to rotate upwards and outboard, pivoting about its joint with the main arm 6, whilst the bottom of the main gear leg carrying the wheels and tyres etc. rotates upwards and inboard. In preferred embodiments the actual geometry of the various elements of the main landing gear assembly and their respective pivotable joints is selected such that there may also be some forward or aft motion of the main landing gear leg 4 as it retracts.

Figure 4:
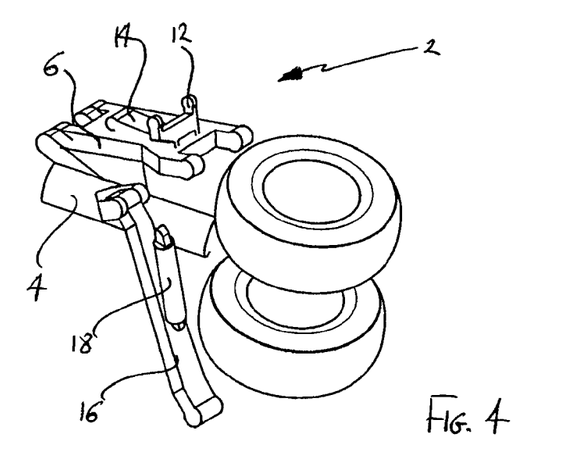
FIG. 4 is an isometric view of the landing gear assembly shown in FIG. 1 in a stowed position.
Figure 5:
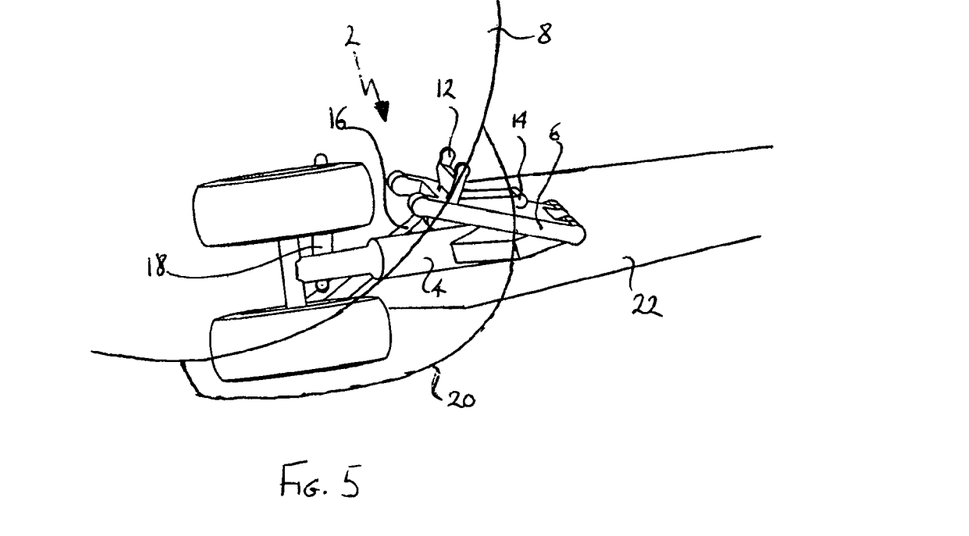
FIG. 5 is a front view of the landing gear assembly shown in FIG. 2 in a stowed position.
Figure 6:
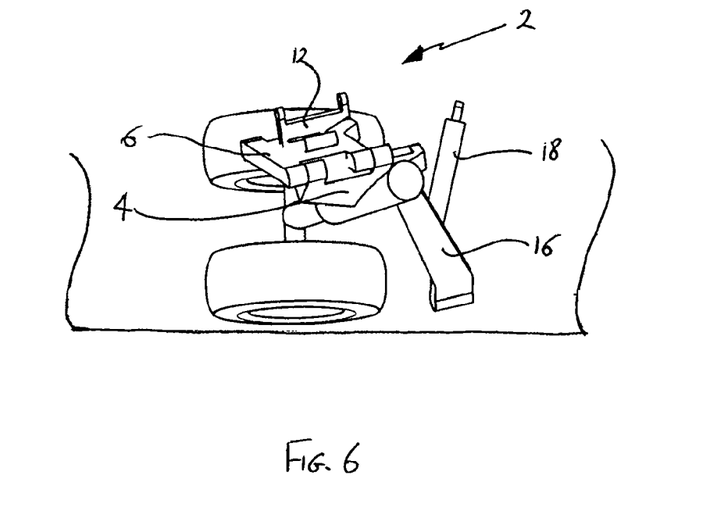
FIG. 6 is a side view of the landing gear assembly shown in FIG. 3 in a stowed position.

FIGS. 4, 5 and 6 illustrate respective views of the main landing gear assembly shown in FIGS. 1, 2 and 3 with the landing gear assembly in the retracted, or stowed, position. As perhaps best illustrated in FIGS. 5 and 6, in the stowed position the wheels, tyres and brakes of the landing gear are substantially enclosed by the main fuselage 8 and preferably lie close to the fuselage centre line. A relative small belly fairing 20 is preferably provided to fully enclose the wheels and tyres of the landing gear. The main landing gear leg 4 and a substantial portion of the main arm 6 and folding stay arrangement 10 lie outboard of the wheels and are substantially enclosed by the aerodynamic profile of the wing 22, with the main landing gear leg 4 centre line lying, in preferred embodiments, approximately parallel with the wing dihedral. As best seen with reference to FIG. 6, in the particular embodiment illustrated the main landing gear leg assembly has also been rotated forward in the retracted position as a consequence of the particular geometry of the leg assembly.

To move the main landing gear assembly back to the deployed position illustrated in FIGS. 1 to 3 from its retracted, stowed, state, the reverse sequence of events occurs and is preferably powered by both the main retraction actuator 18 and the unlocking stay actuator (not illustrated). However, the geometry of the landing gear assembly is such that it will revert to the deployed position where allowed to do so under the influence of gravity. Deployment of the landing gear leg assembly to the down position is assisted, especially under gravity "free fall" conditions, by one or more lock springs (not illustrated) included within the folding stay assembly and which are energised during the retraction sequence. The use and arrangement of such lock springs in conjunction with the stay mechanism will be known to those skilled in the art.

Figure 7:
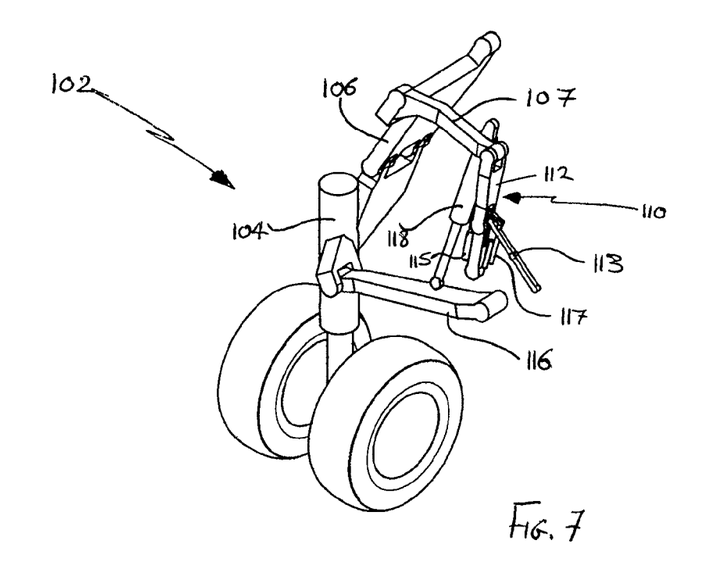
FIG. 7 is an isometric view of a main landing gear assembly in a deployed position according to a second embodiment of the present invention.
Figure 8:
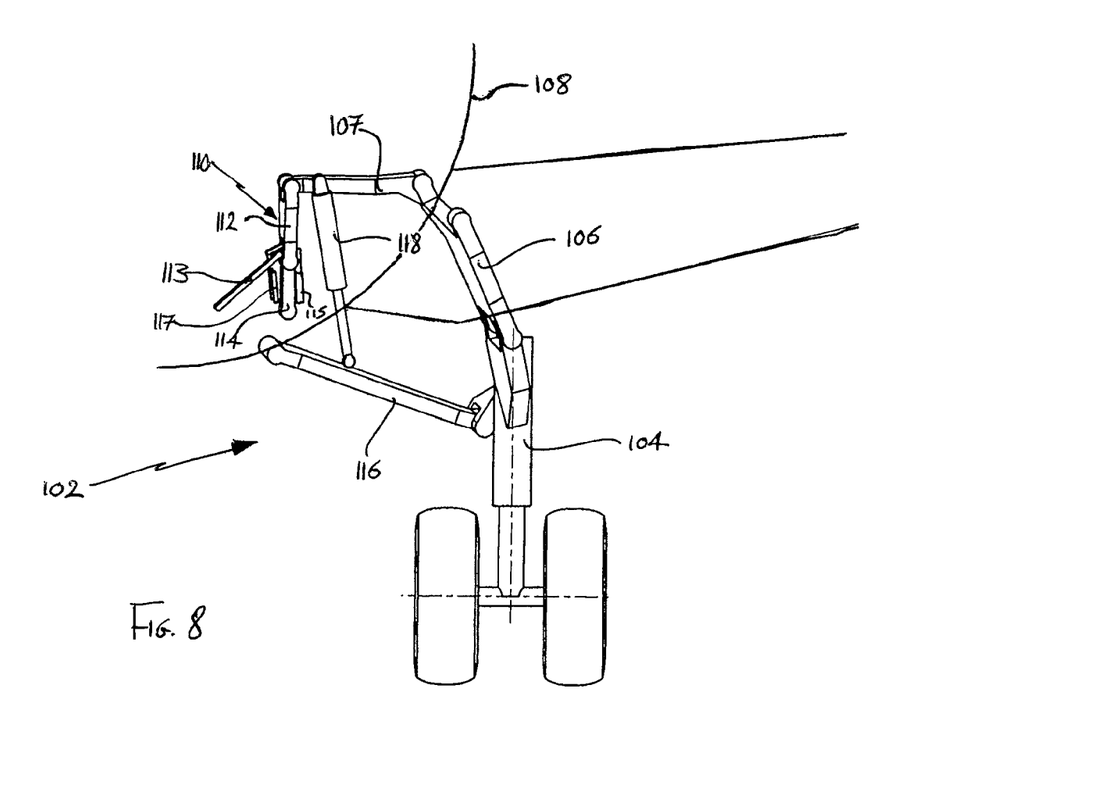
FIG. 8 is a front view of the landing gear assembly of FIG. 7 in the deployed position.
Figure 9:
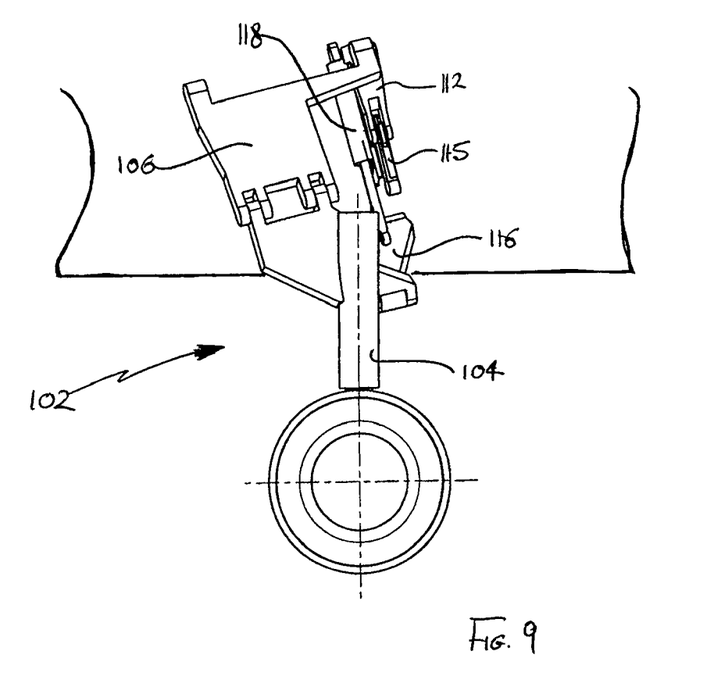
FIG. 9 is a side view of the main landing gear assembly of FIGS. 7 and 8 in the deployed position.

A second embodiment of the present invention is illustrated in FIGS. 7 to 12. In FIGS. 7 to 9 the landing gear assembly 102 according to the second embodiment of the present invention is illustrated, respectively, in an isometric view looking from behind the left hand landing gear assembly towards the front of the aircraft, looking from the front of the aircraft back towards the left hand landing gear leg assembly in FIG. 8 and in FIG. 9 looking at the side of the landing gear assembly with the front of the aircraft being towards the left hand side of the figure.

The main landing gear assembly 102 comprises a telescopic main landing gear leg 104 as previously described with reference to the first embodiment. Pivotably attached to the landing gear leg 104, preferably by means of a revolute joint, is a main arm 106, which is generally elongate. The main arm 106 is also pivotably attached at its opposite end, again preferably by means of a revolute joint, to aircraft fuselage 108. At the point of attachment to the fuselage 108, the main arm 106 also includes an elongate extension arm 107 that is angled with respect to the main portion of the main arm 106 so as to be directed substantially inboard of the aircraft fuselage. The extension arm 107 is pivotably attached at its free end, preferably by means of a further revolute joint, to the upper arm 112 of a folding stay assembly 110. The opposite end of the generally elongate upper folding arm 112 is pivotably connected to a lower arm 114 that in turn is pivotably connected, preferably by means of a further revolute joint, at its opposite end to the aircraft fuselage structure. The folding stay assembly in the illustrated second embodiment of the present invention is orientated in a generally vertical position when the landing gear is in the deployed position, as best seen in FIG. 8. The folding stay assembly 110 is braced by a set of lock stays 113, which need to be rotated over centre (i.e. in the inboard direction) by an unlocking actuator 115 when it is required to retract the gear. The lock stays 113 are prevented from rotating over centre by a set of lock springs 117. In the deployed position of the landing gear assembly, the folding stay assembly 110 locks the main arm 106 so that it cannot rotate about its fuselage attachment joint. The main landing gear leg 104 is also restrained laterally by a side brace 116 that is pivotably attached between the main landing gear leg 104, preferably via a revolute joint, and the aircraft structure 108, again preferably via a further revolute joint. The main landing gear leg 104, side brace 116, main arm 106 and the aircraft structure 108 form a "four bar linkage" in a similar fashion to that of the first embodiment of the present invention. In a similar manner, a retraction actuator 118 is pivotably attached between the side brace 116 and the aircraft structure.

Figure 10:
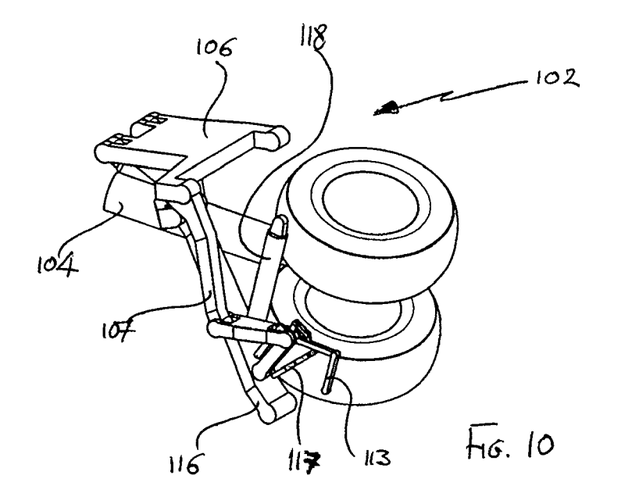
FIG. 10 is an isometric view of the landing gear assembly shown in FIG. 7 in a stowed position.
Figure 11:
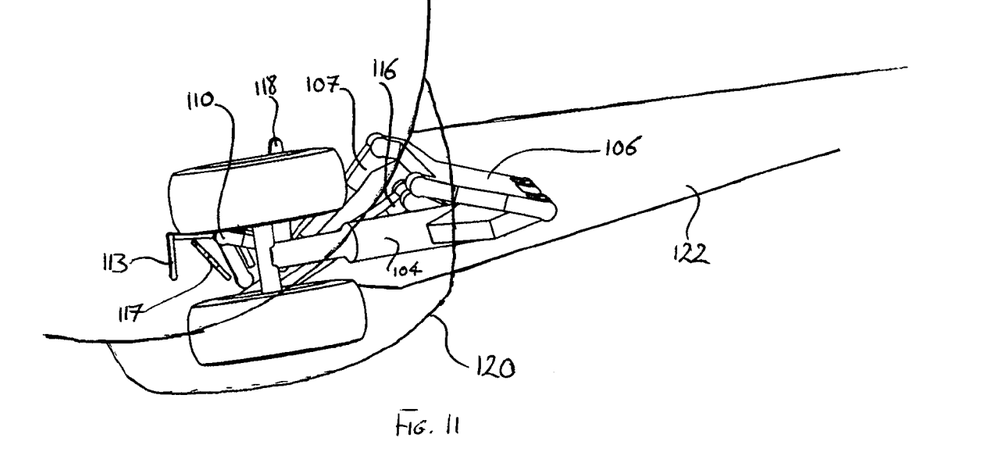
FIG. 11 is a front view of the landing gear assembly shown in FIG. 8 in a stowed position.
Figure 12:
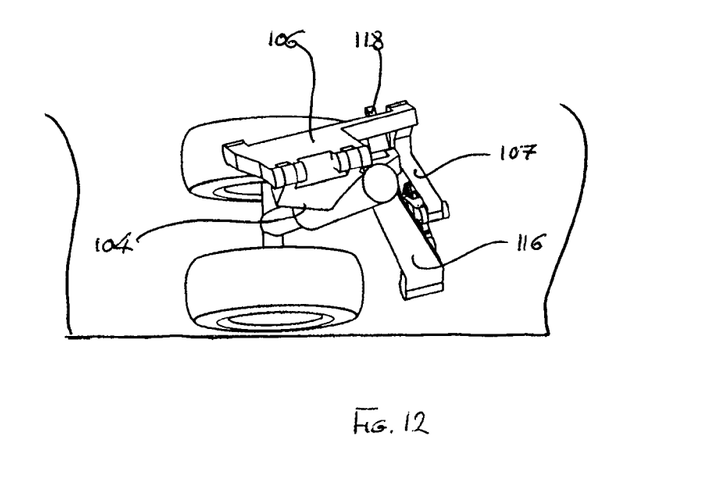
FIG. 12 is a side view of the landing gear assembly shown in FIG. 9 in a stowed position.

FIGS. 10 to 12 illustrate the main landing gear assembly of the second embodiment of the present invention in the retracted, stowed, position with corresponding respective views to those of FIGS. 7 to 9. To retract the landing gear assembly the unlock actuator 115 pushes, or alternatively may be designed to push, the lock links 113 over centre, i.e. in an upwards and inboard direction. As the unlock actuator pushes the lock links 113 further, the folding stay assembly 110 will also start to go over centre at its centre joint, that is the centre joint will move inboards. This geometrically unlocks the landing gear arrangement and enables the main retraction actuator 118 to commence pulling the solid side brace 116 such that the side brace rotates upwards about the pivotable joint between the side brace and the aircraft structure. This in turn, by virtue of the "four bar linkage" arrangement, causes the main arm 106 to rotate about the pivoting joint where it attaches to the aircraft structure, such that the end of the main bar 106 pivotably attached to the main landing gear leg 104 is rotated in an upwards and outboard direction, whilst the bottom of the landing gear leg 104 carrying the wheels, tyres and brakes etc. rotates upwards and inboard. As with the first embodiment of the present invention, depending on the geometry of the landing gear assembly there can also be some forward or aft motion of the main landing gear leg assembly as it retracts.

With reference to FIG. 11, in this embodiment of the present invention the retracted position of the landing gear assembly 102 has the main landing gear leg 104 centreline lying approximately parallel with the wing 122 dihedral. The wheels, tyres and brakes are substantially enclosed by the main fuselage 108, with only a small belly fairing 120 being preferably provided to completely enclose the structures, the wheels, tyres and brakes, lying close to the fuselage centreline. The main landing gear leg 104 lies substantially outboard of the wheels, tyres and brakes and is preferably mainly enclosed by the aerodynamic profile of the wing 122. In addition, and as best seen via reference to FIG. 12, the main landing gear leg assembly 102 has preferably been rotated forward in the retracted, stowed, position.

To move the landing gear assembly back to the deployed, down, position from the retracted, stowed, state, the reverse sequence of events occurs and is normally powered by the main retraction actuator 118 and the locking actuator 115. However, the geometry of the landing gear leg assembly is such that when allowed it will fall naturally to the deployed position under the influence of gravity. The landing gear leg assembly is fully deployed and geometrically locked again once the lock links 113 are returned back to the over centre position. Assistance is provided, especially under "free fall" conditions, to move the lock links over centre by the lock springs 117, which are energised during the retraction sequence.

Since the main landing gear assembly of embodiments of the present invention is substantially stowed in-flight within the aircraft body and the aerodynamic profile of the wing, with only a relatively small belly fairing being required to completely enclose the landing gear assembly, the aircraft presents a more aerodynamic shape to the airflow than with body mounted landing gear assemblies of the known prior art. Additionally, the body mounted landing gear of embodiments of the present invention avoids putting landing gear loads into the wing and also allows a wider spacing between the landing gear legs than with the known types of body mounted landing gears, hence improving the aircraft stability on the ground.

The invention claimed is:

1. An aircraft landing gear assembly, comprising:
   a landing gear leg,
   a main arm pivotably attached at a first end to the landing gear leg and arranged to be pivotably attached at a second end to an aircraft fuselage,
   a side brace pivotably attached at a first end to the landing gear leg and arranged to be pivotably attached at a second end to the aircraft fuselage, wherein the landing gear leg, the main arm, the side brace, and the aircraft fuselage form a four bar linkage pivotably attached to the aircraft fuselage and movable between a deployed position and a retracted position, wherein at least a first portion of said landing gear assembly is housed within a wing of said aircraft when in the retracted position.

2. An aircraft landing gear assembly according to claim 1, wherein at least a second portion of the landing gear assembly is housed within the aircraft fuselage when in the retracted position.

3. An aircraft landing gear assembly according to claim 1, wherein a greater part of the main arm is housed within the aircraft wing when in said retracted position.

4. An aircraft landing gear assembly according to claim 1, wherein the landing gear leg is arranged to have at least one landing wheel mounted thereon and wherein when the landing gear assembly is in the retracted position a greater part of the landing wheel is housed within the aircraft fuselage.

5. An aircraft landing gear assembly according to claim 1, further comprising a retraction actuator connected between the side brace and the aircraft fuselage.

6. An aircraft landing gear assembly according to claim 1 further comprising a folding stay assembly pivotably attached to the main arm and the aircraft fuselage and arranged to brace the landing gear assembly when the assembly is in the deployed position.

7. An aircraft landing gear assembly according to claim 1, wherein the assembly is arranged to be pivotably attached to the aircraft fuselage by one or more revolute joints.

8. In combination, an aircraft and a landing gear assembly, wherein said landing gear assembly further comprises a landing gear leg,
a main arm pivotably attached at a first end to the landing gear leg and arranged to be pivotably attached at a second end to an aircraft fuselage,
a side brace pivotably attached at a first end to the landing gear leg and arranged to be pivotably attached at a second end to the aircraft fuselage, wherein the landing gear leg, the main arm, the side brace, and the aircraft fuselage form a four bar linkage pivotably attached to the aircraft fuselage and movable between a deployed position and a retracted position, wherein at least a first portion of said landing gear assembly is housed within a wing of said aircraft when in the retracted position.

* * * * *